US 6,573,711 B1

(12) United States Patent
Schaenzer et al.

(10) Patent No.: US 6,573,711 B1
(45) Date of Patent: Jun. 3, 2003

(54) PADDLE BOARD WITH EXTENDED FLEXIBLE LEADS

(75) Inventors: Mark James Schaenzer, Eagan, MN (US); Frank William Schadewald, Bloomington, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/190,496

(22) Filed: Nov. 12, 1998

Related U.S. Application Data

(60) Provisional application No. 60/070,849, filed on Jan. 8, 1998.

(51) Int. Cl.$^7$ .............................. G11B 5/48; G01R 33/12
(52) U.S. Cl. ................................... 324/210; 360/245.9
(58) Field of Search .................... 324/210, 211, 324/212, 252, 260, 261; 360/240, 245, 245.8, 245.9; 428/209; 439/77, 67, 408, 465, 499, 531, 876, 493; 174/117 F, 117 FF

(56) References Cited

U.S. PATENT DOCUMENTS

| | | | | |
|---|---|---|---|---|
| 3,605,060 A | * | 9/1971 | Praeger et al. | 439/494 |
| 3,795,885 A | * | 3/1974 | Desso et al. | 361/749 |
| 4,181,384 A | * | 1/1980 | Dola et al. | 339/14 R |
| 4,645,280 A | * | 2/1987 | Gordon et al. | 360/104 |
| 4,815,981 A | * | 3/1989 | Mizuno | 439/77 |
| 5,086,652 A | * | 2/1992 | Kropp | 73/767 |
| 5,219,640 A | * | 6/1993 | Gazit et al. | 428/209 |
| 5,282,103 A | * | 1/1994 | Hatch et al. | 360/104 |
| 5,309,316 A | * | 5/1994 | Yagi et al. | 174/260 |
| 5,508,611 A | * | 4/1996 | Schroeder et al. | 324/252 |
| 5,834,084 A | * | 11/1998 | Maggio | 428/64.1 |
| 5,870,258 A | * | 2/1999 | Khan et al. | 360/104 |
| 5,883,759 A | * | 3/1999 | Schulz | 360/104 |
| 5,955,176 A | * | 9/1999 | Erpelding et al. | 428/209 |
| 6,034,851 A | * | 3/2000 | Zarouri et al. | 360/137 |
| 6,134,075 A | * | 10/2000 | Benni et al. | 360/104 |

OTHER PUBLICATIONS

Palmer, D., Integrated Lead Suspension Assemblies Take the Hard Disk Drive Industry by Storm, Datatech, 1996, ICG Publishing Ltd., London, England, pp. 65–69.

* cited by examiner

*Primary Examiner*—Jay Patidar
(74) *Attorney, Agent, or Firm*—Moser, Patterson and Sheridan, LLP

(57) ABSTRACT

A paddle board with flexible extended leads is provided. The paddle board includes a chassis and a flexible lead portion. The flexible lead portion has wire traces disposed therein for receiving a plurality of wires from a parametric test head. The paddle board may be connected to a socket of a testing assembly for testing the performance of a batch of storage media. The paddle board reduces the amount of damage or breakage to the wires extending from the testing head.

18 Claims, 3 Drawing Sheets

PADDLE BOARD WITH EXTENDED FLEXIBLE LEADS

This application is a continuation of Provisional patent application Serial No. 60/070,849 filed Jan. 8, 1998, entitled, "Paddle Board With Extended Flexible Leads."

BACKGROUND OF THE INVENTION

The present invention relates generally to testing equipment for rigid discs, and more particularly to a terminal connector for use with a magnetic recording head.

The demand for reliable, accurate and cost effective testing of rigid discs exists throughout the disc manufacturing industry. The rapid growth and technological innovation in the disc manufacturing industry over the last several years has created a demand for testers capable of accurately testing and evaluating the mechanical and read/write performance of the disc. The demand is particularly high in Lot Acceptance Testing (LAT), where a numerous amount of discs are tested in one batch prior to shipment to the disc supplier.

Several tests are known which verify the performance of a rigid disc, for example, a magnetic disc. One such test is glide height testing. This test verifies the mechanical performance at the surface of the disc. For example, defects such as blistering on the disc substrate may be found. Another known test is the certification test. In this test, the integrity of the magnetic layer is determined. For example, it is determined whether the magnetic layer can read or write data precisely and accurately to the desired threshold. In the glide height and certification tests, pre-designed testing heads are used. In particular, when these heads are manufactured, they are equipped with a pre-specified mechanical and wire configuration such that they are easily adapted to the disc testing equipment.

Another well-known test is parametric testing. Parametric testing determines the performance of the disc, for example, the signal-to-noise ratio of the recorded signals on the disc.

Generally in parametric testing, a signal is supplied as an input to the disc being tested in order to measure or determine an output signal. The output signal may be amplified in order to determine or monitor a characteristic of the tested item. In parametric testing, there is an AC (alternating current) and a DC (direct current) test.

In DC testing, the signal input and output vary over a broad dynamic signal range, but at relatively slow speeds. In this test, the transmission of signals is typically subject to problems such as line losses, extraneous signal pick-up, and ground and temperature differentials. In AC testing, the output and input signals operate over a narrow dynamic range, and at high speeds. Typically the output signal is affected by factors such as line loading and impedance effects.

Parametric testing heads are typically the same heads that are used in a head-disc assembly of a disc drive. These heads are manufactured in high volume with a given mechanical configuration and wire length. Thus, in many cases, the wire length is too short to connect with the testing assembly used in the parametric testing procedure. As a result, the wires are extended by splicing or adding additional wire. This splicing process can be expensive and may cause wire damage, breakage, or poor performance in the product head. In addition, such wires cause the input/output signals to suffer from the above-mentioned problems such as line loading and impedance effects.

During testing, the parametric heads are used to statistically test each loader disc prior to shipment, and also on receipt by the drive manufacturer. If the statistical sample passes a set of predetermined criteria, the entire lot is accepted or rejected. If a poor performing head is used, the lot may be rejected inadvertently. This results in the waste of magnetic discs, and adds to the manufacturer's cost.

One method of extending the wire length of product heads is to solder an additional wire to the head. Another known method is to wirebond the wires to a flex circuit. One disadvantage to these methods is that the wire is easily broken (i.e., the wire is commonly 0.002 in diameter) causing the head to malfunction. In addition, protective tubing normally traverses the length of the wire. In the above methods, this tube must be removed which exposes the wire, thereby increasing the chance of the wire being damaged.

SUMMARY OF THE INVENTION

In general, the present invention is directed towards a paddle board having a flexible leads for connection to a plurality of wires of a testing head. The paddle board includes a chassis and a flexible lead portion. A plurality of wire traces are formed onto the paddle board to receive the plurality of wires from the testing head.

Accordingly, in one aspect, the paddle board includes a first portion and a second portion. A plurality of pads are formed on the first portion. The plurality of wire traces are formed onto the first and second portion to receive the plurality of wires from the testing head.

Implementations of the invention include one or more of the following. The first and second portion may be fabricated from the same material, for example, Kapton™ or polyimide. The pads may be formed from gold, silver or copper. A second material may be added to the paddle board to increase its stiffness. A plurality of holes may be formed in the first portion. The plurality of wires from the test head may be attached to the wire traces by ultrasonic bonding, soldering, or thermo-compression. The test head may be an inductive head, a magneto-resistive head or a giant magneto-resistive head. The first portion may be connected to a testing system. One of the plurality of wire traces may transmit a read signal or a write signal between the test head and the testing assembly.

In another aspect, the invention is directed to a testing system which includes a testing assembly having a socket and a test head. A first portion of the paddle board is connected to the socket and a second portion of the paddle board is connected to the wires of the test head.

DESCRIPTION OF THE PREFERRED EMBODIMENTS

Figure 1:
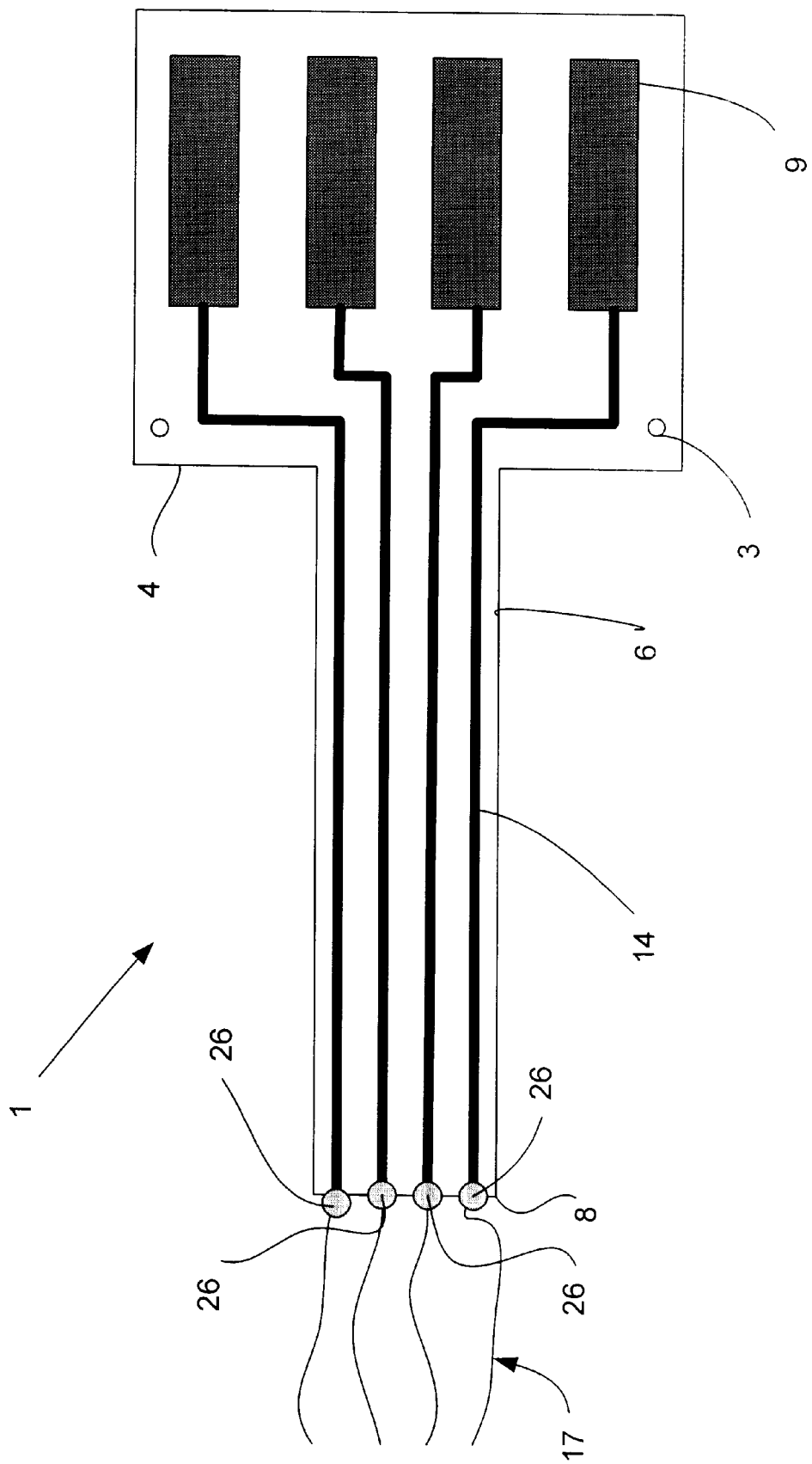
FIG. 1 illustrates a paddle board in accordance with an embodiment of the present invention.

FIG. 1 illustrates an implementation of a paddle board 1 in accordance with an embodiment of the present invention. Paddle board 1 includes a chassis 4 and a flexible lead portion 6. Chassis 4 and flexible lead portion 6 are fabricated from a flexible material suitable for testing applications. Suitable flexible materials include Kapton™ and polyimide. Paddle board 1 may have a thickness of about 0.002 inches. Chassis 4 and flexible portion 6 may be fabricated from the same sheet of material. Chassis 4 and flexible portion 6 may also be fabricated individually and then attached by suitable methods.

Chassis 4 includes pads 9. Pads 9 establish an electrical contact between paddle board 1 and testing assembly 10 during the testing procedure. Pads 9 may be made from any material which is able to conduct an electrical current through pads 9. Suitable materials include gold, silver, and copper.

Figure 3:
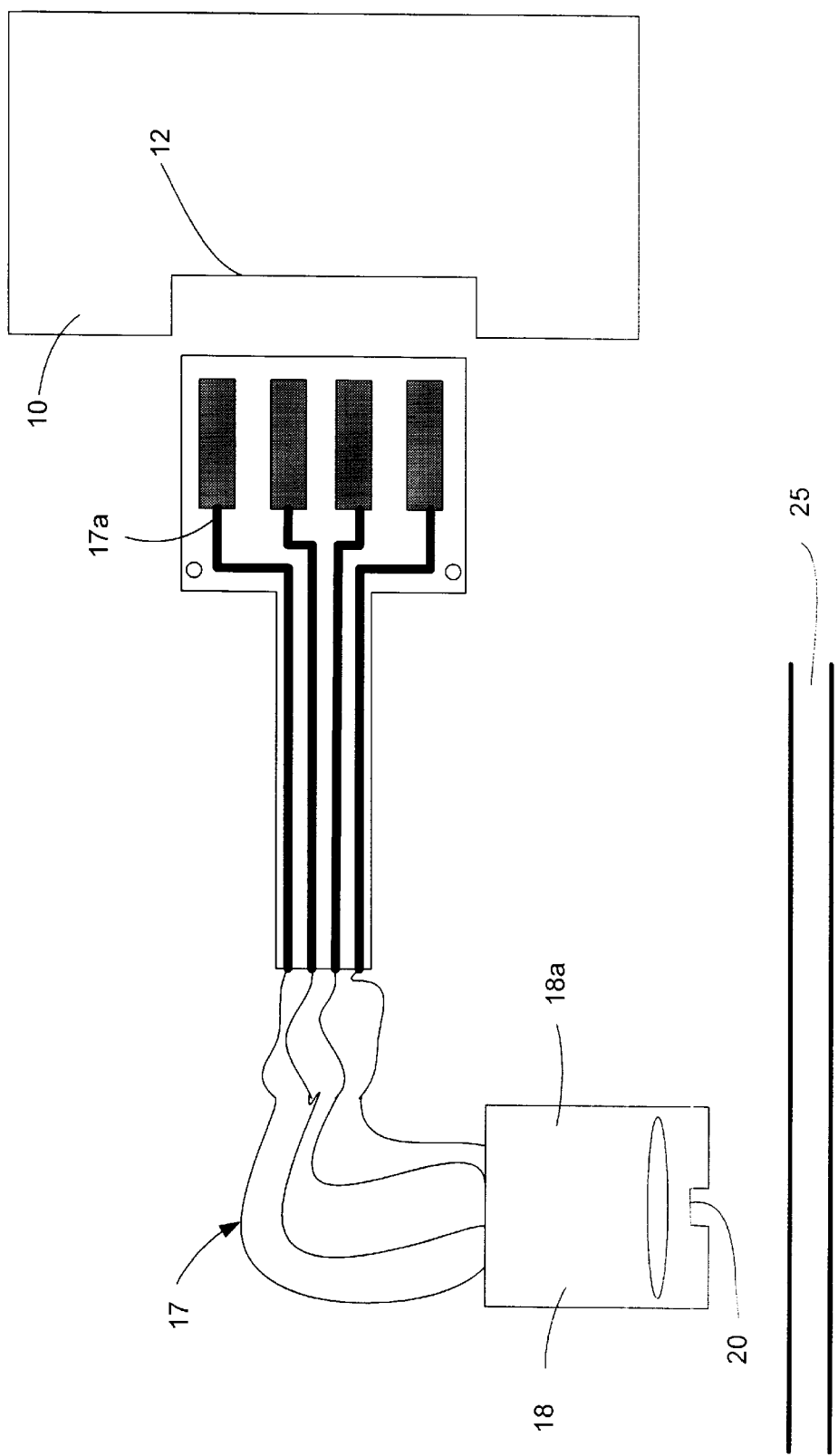
FIG. 3 illustrates a testing assembly for use with the paddle board of FIGS. 1 and 2.

Referring to FIG. 3, chassis 4 is connected to socket 12 of testing assembly 10. Socket 12 is typically an amplifier input/output for transmitting read and write signals to and from the media under test. The size and shape of chassis 4 depends on the dimensions of socket 12. Generally, chassis 4 has dimensions which are slightly less than the dimensions of socket 12. Chassis 4 may be rectangular or square. Chassis 4 may have a length of about 0.5 inches.

In many cases, the material of chassis 4 may not be adequately stiff to avoid bending or breaking when chassis 4 is plugged into socket 12 of testing assembly 10. It has been found that a material may be added to a portion or all of chassis 4 to strengthen the chassis 4. Suitable materials include Kapton™ and fiber reinforced fabric (FRP). In this case, the total thickness of chassis 4 may be about 0.016 inches.

Referring again to FIG. 1, paddle board 1 includes holes 3 which extend through the material of chassis 4. Holes 3 may facilitate the insertion and removal of paddle board 1 to or from socket 12 of testing assembly 10. For example, an instrument such as tweezers may be inserted into holes 3 to engage or disengage paddle board 1 from projections (not shown) inside socket 12. Thus, damage due to inadvertent or incorrect insertion or removal of the paddle board 1 into socket 12 may be avoided. Holes 3 also are an indexing point for aligning paddle board 1 relative to drivehead 18 during the wire bonding process, as described below. The number of holes 3 on chassis 4 may be between 2 and 4.

FIG. 1, illustrates wire traces 14 extend from pads 9 across flexible portion 6. Wire traces 14 may be circuit pads which are etched or machined into paddle board 1. Wire traces 14 may be about 0.005 inches to 0.010 inches in pitch. Flexible portion 6 may be about 0.060 inches wide. Traces 14 may be gold-plated to enable wire bonding, as discussed below.

Figure 2:
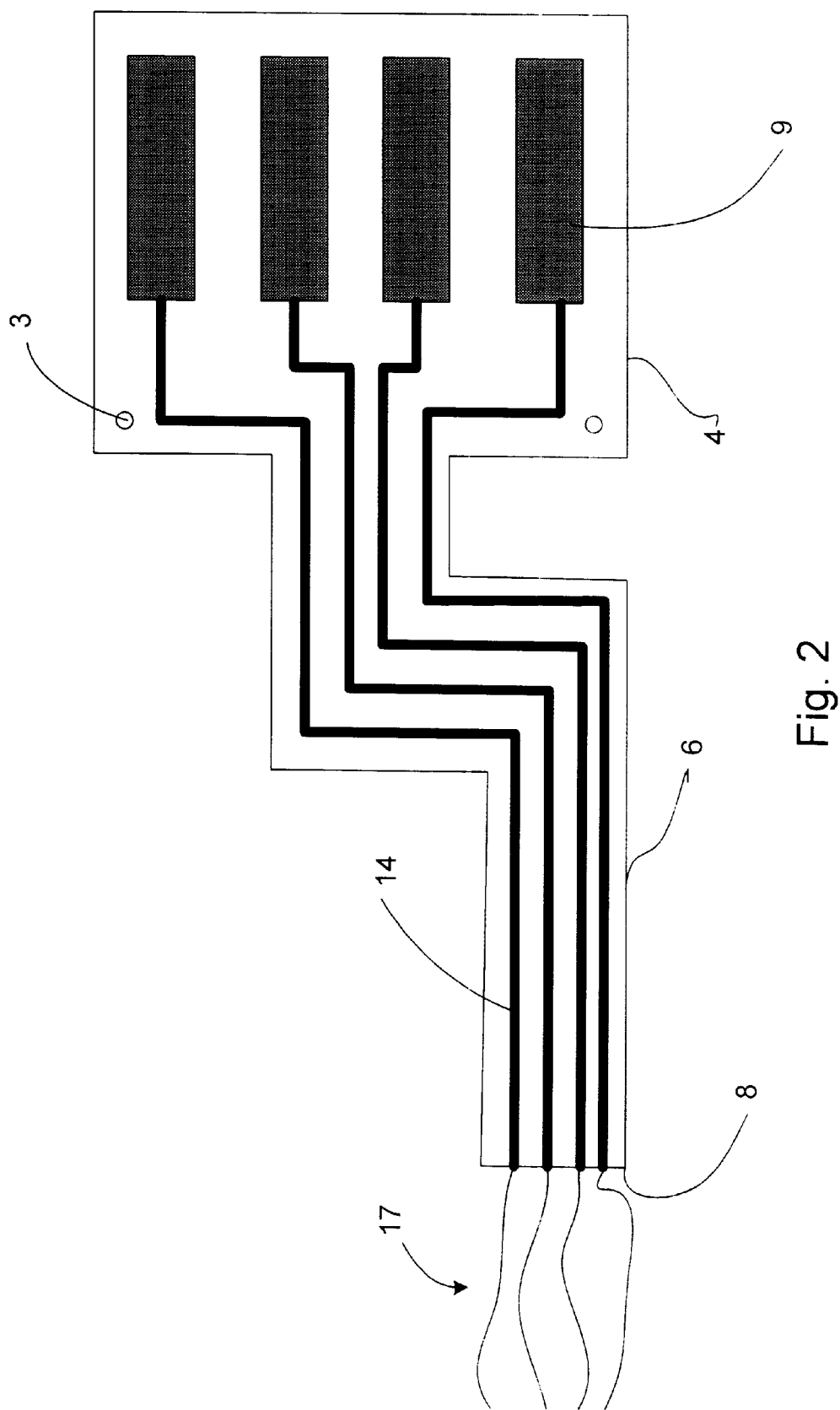
FIG. 2 illustrates a second embodiment of the paddle board of FIG. 1.

As discussed above, flexible portion 6 is constructed from a flexible material such as Kapton™. As seen in FIG. 1, wire traces 14 are generally parallel to each other. Flexible portion 6 may also include a plurality of bends before attaching to head 18 (see FIG. 2).

When wires 17 of head 18 are attached to trailing edge 8 of flexible portion 6, wires 17 may be exposed to a high level of strain. This may result in damage or breakage to the wires during the wire bonding process. An epoxy or adhesive 26 may be added to the trailing edge 8 of flexible portion 6 before the bonding process to reduce the strain release of wires 17.

Paddle board may have two, four or five wire traces 14 for a specific testing application. In a two wire system, one of the traces 14 is used to write a signal and the other to read a signal from the media under test. In a four wire system, two of the wire traces 14 may be used to read a signal from and two wires may be used to write a signal to the media under test. It should be noted that any combination of wires may be used. For example, the top and bottom wires may be used to read a signal, and the center wires may be used to write a signal or a write signal. In a five wire operating regime, for example, for dual strip magneto-resistant head applications, one of the wire traces 14 may be used as a common ground. Alternatively, three wire traces may be used for a read signal. It should be noted that more than five wire traces are possible depending on the application.

Referring now to FIG. 3, paddle board 1 is connected to testing apparatus 10 via socket 12. Suitable testing equipment is manufactured by, for example, Sony, Hitachi, and Cambrian. As discussed above, chassis 4 is in electrical contact with socket 12 during testing operations. A head 18 is connected to trailing edge 8 of paddle board 1. Testing head 18 includes a plurality of wires 17, a body 18A, and a transducer 20. Transducer 20 reads and/or writes information to and from the media under test, for example, a disc 25. Suitable heads include magneto-resistive, inductive, and giant magneto-resistive heads.

Generally, wire traces 14 extend from head 18 to chassis 4. Wire traces 14 may have a length of about 1 to 2 inches. Flexible portion 6 may also include a flexible tubular portion which covers wire traces 14 to provide additional protection to wire traces 14.

Wires 17 may be attached to paddle board 1 as follows. In a first step, the flexible portion 6 is trimmed to provide a suitable length for the application, for example, one inch. In a second step, an adhesive 26 or a drop of epoxy is deposited on edge 8 of flexible portion 6. As discussed above, the deposition of an epoxy or adhesive 26 may reduce the strain relief on wires 17 of head 28. In a third step, the wires are bonded to the wire traces such that each of wires 17 is aligned with one of wire traces 14. Wires 17 may be bonded to edge portion 8 using, for example, ultrasonic bonding, thereby minimizing the effects of soldering discussed elsewhere herein. Other suitable techniques include thermal compression, conductive adhesives, or soldering. As shown in FIG. 3, wires 17 are bonded to the wire traces 14 such that a terminal end 17a of one of the wires 17 is in electrical contact with one of the pads 9. Wires 17 may be connected to pads 9 by thermal compression, conductive adhesives, or soldering.

The present invention has been described in terms of a number of embodiments. The invention, however, is not limited to the embodiments depicted and described. For example, variations in materials of the paddle board may be used, as well as certain variations of the length of its components may be used for different testing applications.

What is claimed is:

1. A connector for use with a testing head, the connector comprising:
    a chassis and a flexible lead portion;
    a plurality of pads formed on a surface of the chassis;
    a plurality of wire traces formed onto the chassis and the flexible lead portion
    a plurality of wires from the testing head electrically bonded to said traces, and
    a strain-relief adhesive adhering said wires to said flexible lead portion;
    the chassis having a shape adapted to connect with a socket of a testing assembly.

2. The connector of claim 1, wherein the chassis and the flexible lead portion are fabricated from the same sheet of material.

3. The connector of claim 2, wherein the chassis and flexible lead portion are fabricated from a material comprising at least one of Kapton™ and polyimide.

4. The connector of claim 2, further comprising a second material added to the chassis to stiffen the connector.

5. The connector of claim 1, wherein the plurality of pads are formed from a material comprising at least one of gold, silver, and copper.

6. The connector of claim 1, wherein the shape of the chassis is one of rectangular and square.

7. The connector of claim 1, further comprising a plurality of holes formed in the chassis.

8. The connector of claim 1, wherein the adhesive is added to a trailing edge of the flexible lead portion.

9. The connector of claim 1, wherein the plurality of wire traces is one of two, four and five wire traces.

10. The connector of claim 1, wherein each of the plurality of wires is aligned with one of the plurality of wire traces.

11. The connector of claim 1, wherein the plurality of wires are bonded to the plurality of wire traces by a method comprising at least one of ultrasonic bonding, thermal compression, and soldering.

12. The connector of claim 1, wherein at least one of the plurality of wire traces is operable to transmit a read signal, and at least one of said plurality of wire traces is operable to transmit a write signal.

13. The connector of claim 1, wherein the chassis is connected to a testing assembly to test a plurality of storage media.

14. The connector of claim 1, wherein the test head is one of a magneto-resistive head, an inductive head, and a giant magneto-resistive head.

15. A testing system for testing storage media comprising:
a test head;
a testing assembly having a socket;
a connector connected between the socket of the testing assembly and the test head, the connector including:
  a chassis and a flexible lead portion, the chassis adapted to be connected to the socket of the testing assembly;
  a plurality of pads formed on a surface of the chassis; and
  a plurality of wire traces formed onto the chassis and the flexible lead portion;
a plurality of wires from the testing head electrically bonded to said traces; and
a strain-relief adhesive adhering said wires to said flexible lead portion.

16. The testing system of claim 15, wherein at least one read signal and at least one write signal are transmitted to or from the testing assembly and the test head.

17. The testing system of claim 15, wherein the plurality of wire traces comprises one of two, four, and five wire traces.

18. The testing system of claim 15, wherein the chassis and the flexible lead portion are fabricated from a material comprising at least one of Kapton™ and polyimide.

* * * * *

UNITED STATES PATENT AND TRADEMARK OFFICE
CERTIFICATE OF CORRECTION

PATENT NO. : 6,573,711 B1
DATED : June 3, 2003
INVENTOR(S) : Mark James Schaenzer and Frank William Schadewald It is certified that error appears in the above-identified patent and that said Letters Patent is hereby corrected as shown below:

<u>Title page,</u>
Item [54], please change the title to read:
-- CONNECTOR FOR COUPLING WIRES OF A HEAD TO A TESTING DEVICE --.

Signed and Sealed this

Twenty-third Day of September, 2003

JAMES E. ROGAN
*Director of the United States Patent and Trademark Office*